(12) United States Patent
Kobierski

(10) Patent No.: US 12,554,931 B2
(45) Date of Patent: Feb. 17, 2026

(54) METHOD AND SYSTEM OF IMPROVING COMMUNICATION SKILLS FOR HIGH CLIENT CONVERSATION RATE

(71) Applicant: David Kobierski, Phoenix, AZ (US)

(72) Inventor: David Kobierski, Phoenix, AZ (US)

( * ) Notice: Subject to any disclaimer, the term of this patent is extended or adjusted under 35 U.S.C. 154(b) by 233 days.

(21) Appl. No.: 18/131,866

(22) Filed: Apr. 6, 2023

(65) Prior Publication Data

US 2024/0338525 A1    Oct. 10, 2024

(51) Int. Cl.
| | |
|---|---|
| G06F 40/30 | (2020.01) |
| G06F 40/166 | (2020.01) |
| G06F 40/194 | (2020.01) |
| G06F 40/205 | (2020.01) |
| G06F 40/279 | (2020.01) |
| G10L 15/26 | (2006.01) |
| G10L 25/63 | (2013.01) |

(52) U.S. Cl.
CPC ............ *G06F 40/30* (2020.01); *G06F 40/166* (2020.01); *G06F 40/194* (2020.01); *G06F 40/205* (2020.01); *G06F 40/279* (2020.01); *G10L 15/26* (2013.01); *G10L 25/63* (2013.01)

(58) Field of Classification Search
CPC ...... G06F 40/30; G06F 40/194; G06F 40/279; G06F 40/166; G06F 40/205; G10L 15/26; G10L 25/63
See application file for complete search history.

(56) References Cited

U.S. PATENT DOCUMENTS

| | | | |
|---|---|---|---|
| 8,108,213 B1* | 1/2012 | Pettay | G10L 25/48 704/270.1 |
| 8,489,401 B1* | 7/2013 | Pettay | G06Q 10/06398 704/235 |
| 8,665,863 B2* | 3/2014 | Silverman | H04M 3/5175 379/265.06 |
| 8,811,592 B1* | 8/2014 | Pettay | G10L 15/26 379/265.06 |
| 9,299,341 B1* | 3/2016 | Pettay | G10L 15/26 |
| 9,947,320 B2* | 4/2018 | Lembersky | G06Q 10/06398 |
| 9,992,336 B2* | 6/2018 | Scott | H04M 3/42221 |
| 10,652,391 B2* | 5/2020 | Miller | G06F 7/02 |
| 11,282,405 B2* | 3/2022 | Truong | G10L 15/26 |
| 11,418,652 B1* | 8/2022 | Tron | G06N 20/00 |
| 11,451,664 B2* | 9/2022 | Caron | G10L 25/63 |
| 11,514,385 B2* | 11/2022 | Myers | H04M 3/5175 |

(Continued)

*Primary Examiner* — Daniel C Washburn
*Assistant Examiner* — James Boggs

(57) ABSTRACT

A system and method of improving communication skills for a high client conversation rate is executed by assigning a sales script to at least one specific agent account with a remote server, wherein an administrator account selects the sales script for the specific agent account. At least one client sales call between the by the specific agent account and a potential client is then recorded with the remote server to extract a transcript file from the client sales call. A conversation critiquing engine that is executed with the remote server receives the transcript file and the sales script in order to output a plurality of communication aspects of the client sales call with the conversation critiquing engine. A summarization report of the client sales call is generated from the plurality of communication aspects with the remote server as the summarization report outputs to the administrator account.

16 Claims, 22 Drawing Sheets

(56) References Cited

U.S. PATENT DOCUMENTS

| | | | |
|---|---|---|---|
| 11,544,721 B2* | 1/2023 | An | G06F 40/40 |
| 11,830,516 B2* | 11/2023 | Pisczak | G10L 25/48 |
| 11,862,148 B2* | 1/2024 | Sivasubramanian | H04L 9/0643 |
| 12,034,883 B2* | 7/2024 | Curtin | H04M 3/5166 |
| 2016/0309032 A1* | 10/2016 | Patel | H04M 3/42068 |
| 2019/0253558 A1* | 8/2019 | Haukioja | G10L 15/22 |
| 2020/0143386 A1* | 5/2020 | Tomlinson | G06Q 30/016 |
| 2024/0095644 A1* | 3/2024 | DeFalco | H04M 3/42221 |

* cited by examiner (A) Providing at least one administrator account and a plurality of agent accounts managed by at least one remote server, wherein the administrator account is associated with a corresponding administrator personal computing (PC) device, and wherein each agent account is associated with a corresponding agent PC device (B) Providing a conversation critiquing engine managed by the remote server (C) Assigning a sales script to at least one specific agent account with the remote server, if the administrator account selects the sales script for the specific agent account, wherein the specific agent account is from the plurality of agent accounts (D) Recording at least one client sales call by the specific agent account with the remote server (E) Extracting a transcript file from the client sales call with the remote server

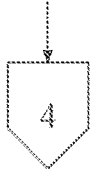

FIG. 3

METHOD AND SYSTEM OF IMPROVING COMMUNICATION SKILLS FOR HIGH CLIENT CONVERSATION RATE

FIELD OF THE INVENTION

The present invention relates generally to an application for the sales and customer service industry. More specifically, the present invention is a software application that analyzes phone conversations between clients and sales representatives to improve communication skills for a high client conversation rate.

BACKGROUND OF THE INVENTION

Sales representatives are responsible for communicating the benefits of a company's products or service in order to drive sales of the company. Sales representatives serve as the point of contact between a business and its prospects or clients and have a range of responsibilities, such as identifying and educating prospective customers while supporting existing clients with information and assistance that relates to products and services. Selling products and services using solid arguments to prospective customers. It is also important for the sales representatives to maintain a positive and efficient business relationship with clients to ensure future sales. As a result, sales representatives always manage to maintain a higher client conversation rate that results in sales. Oftentimes, sale representatives go through an initial training period at the beginning of the employment or intermittent training meeting and do not improve their communication skills on regular day to day basis.

The present invention is an application for sales representatives to improve their communication skills for a higher client conversation rate that can benefit the employer and the employee. More specifically, the present invention records conversations of sales representatives, transcribes them to text, and compare them to pre-written scripts to suggest improvements to the sales representatives. As a result, the present invention is able to continuously improve performance and communication skills of sales representatives thus improving revenues, sales, personalized approach, and customer service of the company.

BRIEF DESCRIPTION OF THE DRAWINGS

FIG. 3 is a flowchart illustrating the overall method of the present invention.

DETAIL DESCRIPTIONS OF THE INVENTION

Figure 1:
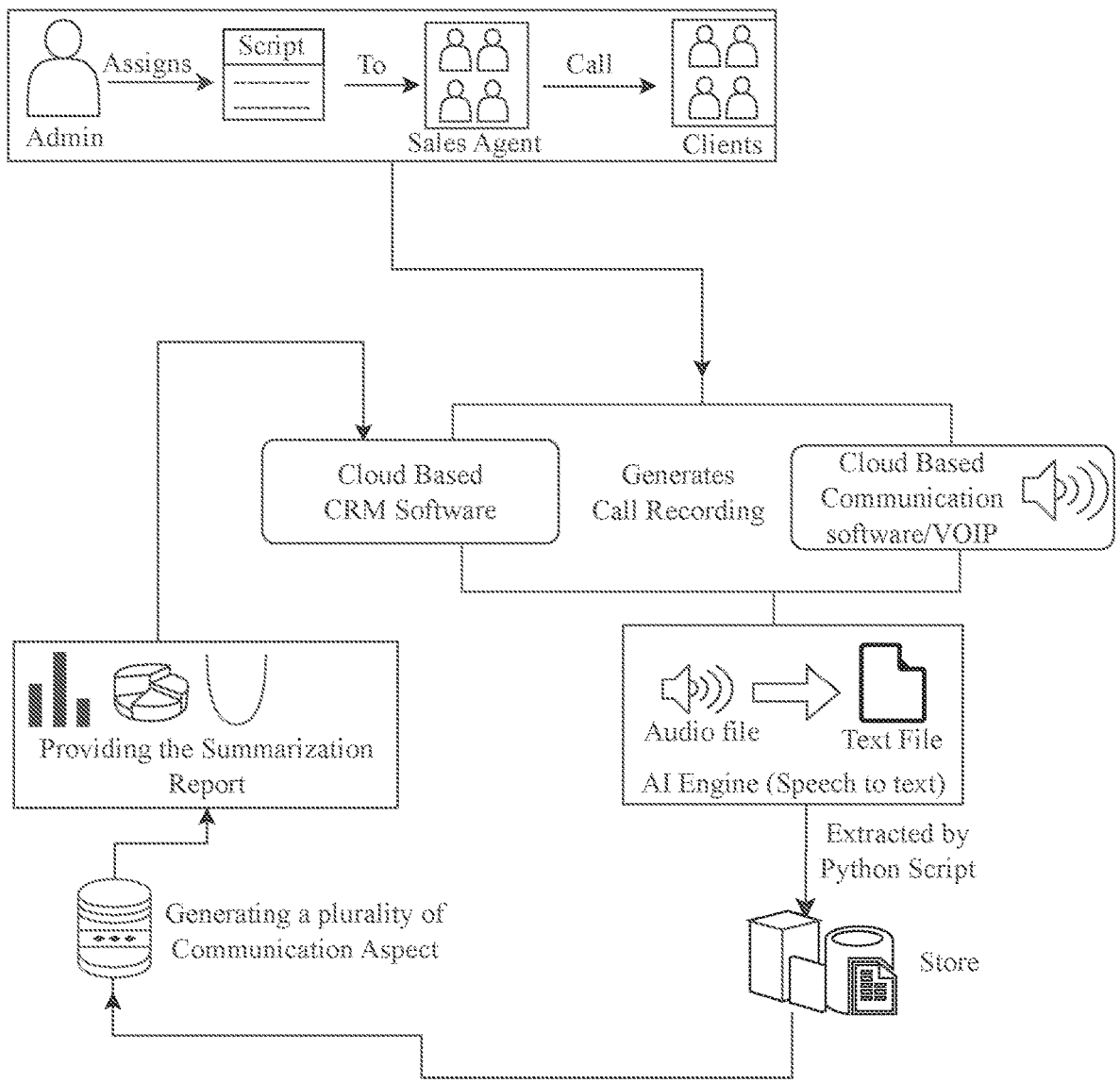
FIG. 1 is a schematic diagram of the present invention.
Figure 2:
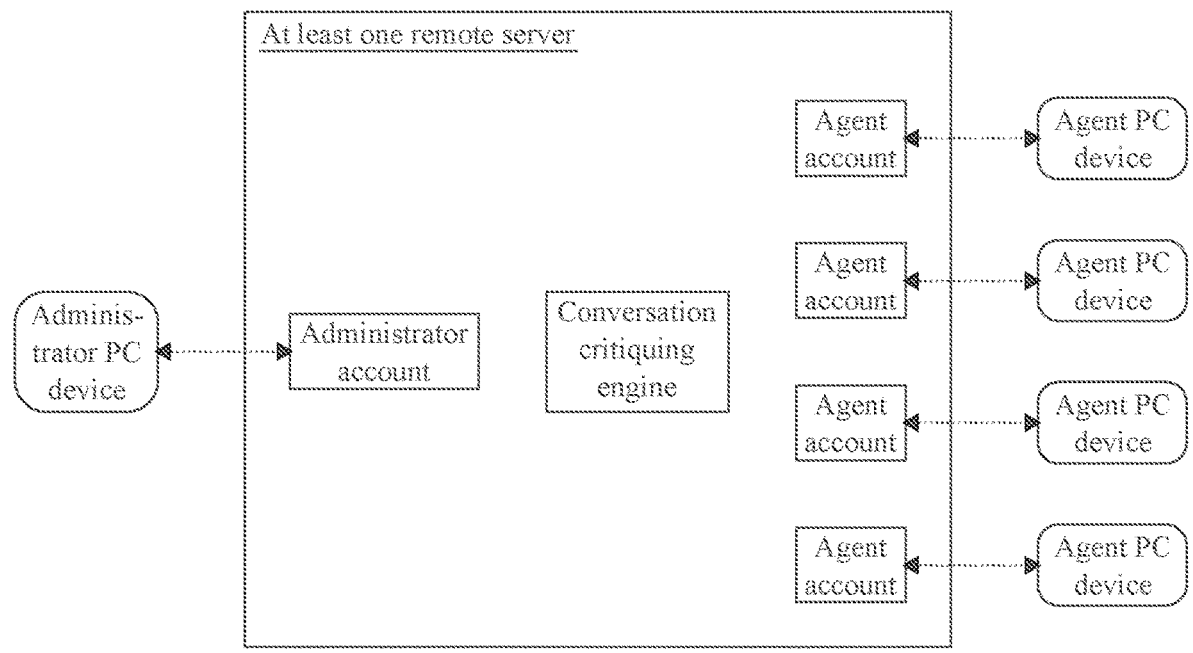
FIG. 2 is a block diagram illustrating the system of the present invention.

All illustrations of the drawings are for the purpose of describing selected versions of the present invention and are not intended to limit the scope of the present invention.

The present invention is a method of improving communication skills for a high client conversation rate. The present invention records conversations of sales representatives, transcribes them to text, and compares them to pre-written scripts to suggest improvements to the sales representatives. As a result, the present invention is able to continuously improve performance and communication skills of the sales representatives thus improving revenues, sales, personalized approach, and customer service of the company.

As can be seen in FIGS. 1-4, a system used to implement the method of the present invention is provided with at least one remote server that manages at least one administrator account and a plurality of agent accounts (Step A). The at least one remote server is wirelessly coupled to a plurality of personal computing (PC) devices using the communication module, wherein the communication module can utilize different wireless protocols including, but not limited to, 4G/5G ethernet and two-way Radio Frequency (RF) technologies. More specifically, the administrator account is associated with a corresponding administrator PC device and each agent account is associated with a corresponding agent PC device. Then, the remote server is able to process any data received from the corresponding administrator PC device and the corresponding agent PC device of any agent account. As can be seen in FIGS. 1-4, a conversation critiquing engine is managed by the remote server so that the remote server is able to process given information at any given time and converts that information to structured inputs that the system can process (Step B). For example, the present invention can use Natural Learning Processing (NLP) or any other similar artificial intelligence engines as the conversation critiquing engine.

The overall process followed by the method of the present invention enables the high client conversion rate. As can be seen in FIGS. 1-4, The administrator account allows a user to implement changes, updates, and inputs to the present invention and allows them to conduct other administrative tasks for the present invention. Each of the plurality of agent accounts allows a user to interact with the present invention as a sales agent. The corresponding administrator PC device and the corresponding agent PC devices can be any computing device with wireless connectivity that enables the transmission of data to/from the remote server. The corresponding administrator PC device and the corresponding agent PC devices can be, but are not limited to, a smartphone, a tablet computer, a desktop computer, a laptop, etc. Further, any wireless communication protocol can be utilized to enable the wireless transmission of data including, but not limited to, short-distance wireless protocols such as Wi-Fi or Bluetooth or long-distance wireless protocols such as cellphone networks.

Figure 5:
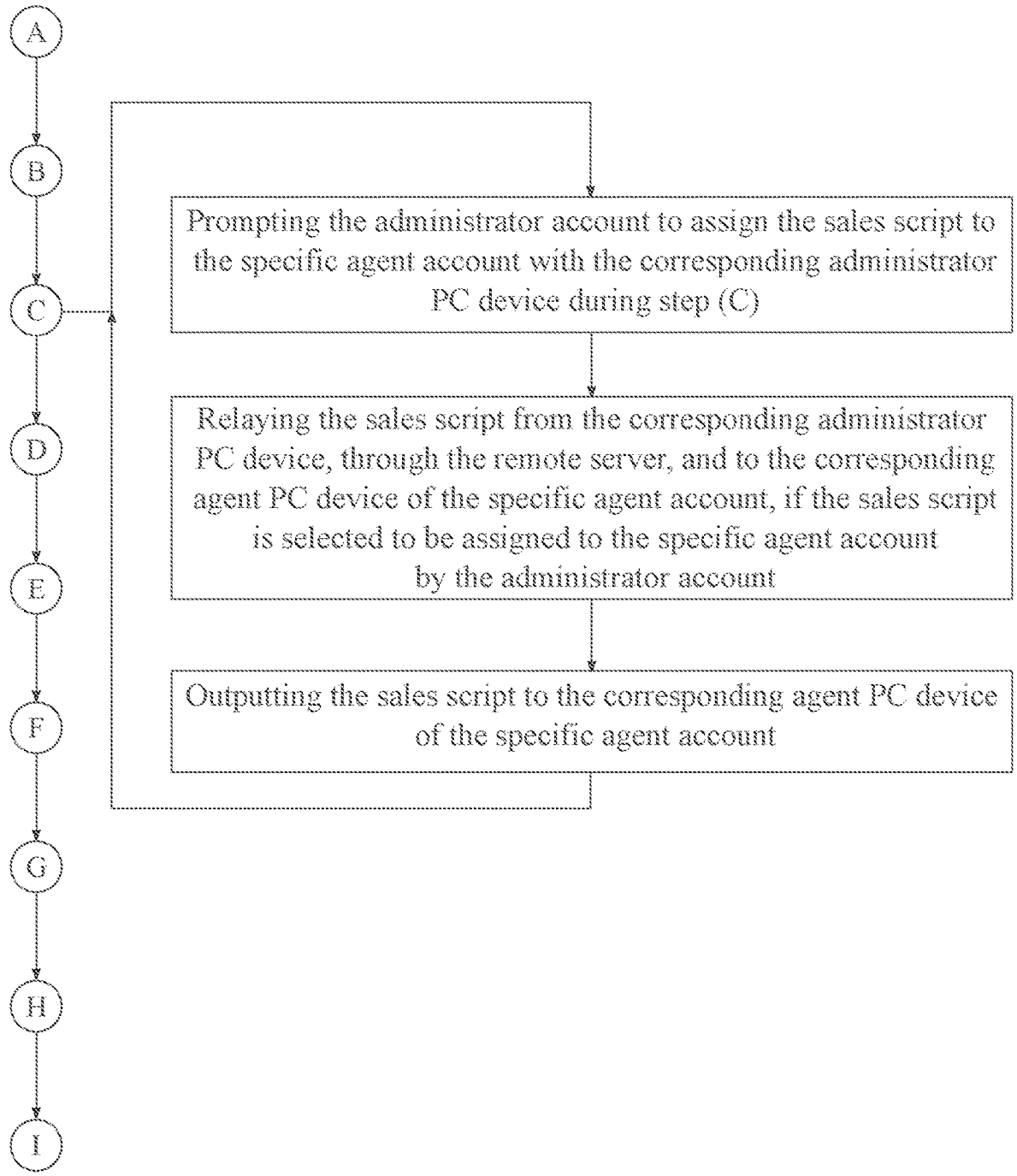
FIG. 5 is a flowchart illustrating a subprocess of assigning the sales script of the present invention.

As can be seen in FIG. 5, the overall process continues by assigning a sales script to at least one specific agent account with the remote server, if the administrator account selects the sales script for the specific agent account, wherein the specific agent account is from the plurality of agent accounts (Step C). More specifically, the administrator account is prompted to assign the sales script with the corresponding administrator PC device during Step C to the specific agent account as the specific agent account is selected from the plurality of agent accounts. The sales script is a detailed guiding document that the sales agent can follow to successfully close out a potential sale. Then, the sales script is relayed from the corresponding administrator PC device, through the remote server, and to the corresponding agent PC device of the specific agent account, if the sales script is selected to be assigned to the specific agent account by the administrator account. The sales script is then outputted to the corresponding agent PC device of the specific agent account. For example, when the sales agent calls a potential client, the sales agent is supposed to follow the sales script that is assigned by the administrator account and outputted with the corresponding agent PC device so that the potential sale can be successfully and efficiently completed. The communication process between the sales agent and the potential client can be conducted via phone calls or a CRM/VOIP system.

Figure 6:
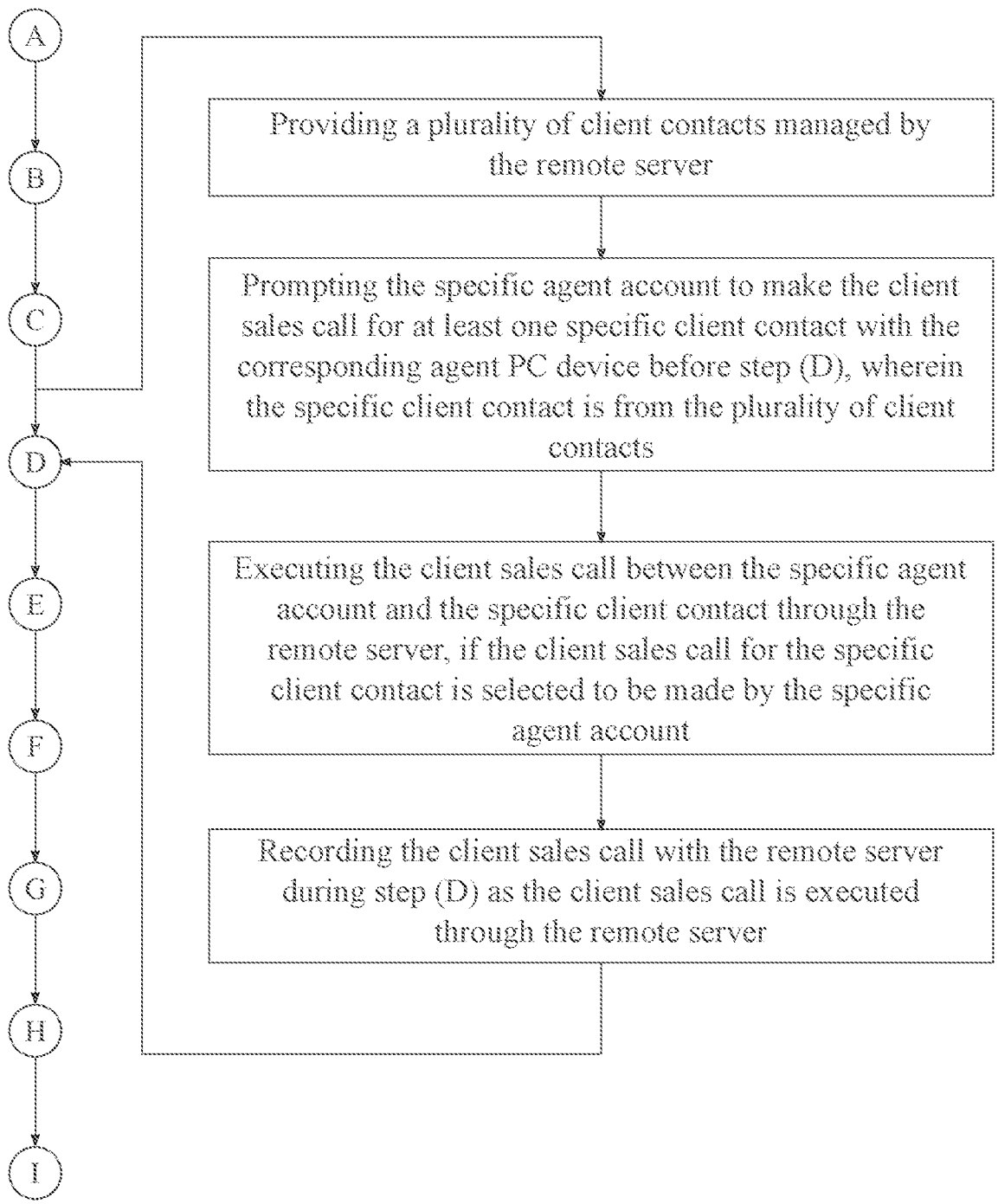
FIG. 6 is a flowchart illustrating a subprocess of recording the at least one client sales call of the present invention.

As can be seen in FIG. 6, the overall process continues by recording at least one client sales call by the specific agent account with the remote server (Step D). More specifically, a plurality of client contacts managed by the remote server is provided to the corresponding agent PC device. The specific agent account is prompted to make the client sales call for at least one specific client contact with the corresponding agent PC device before Step D as the specific client contact is from the plurality of client contacts. Then, the client sales call is executed between the specific agent account and the specific client contact through the remote server, if the client sales call for the specific client contact is selected to be made by the specific agent account. Then, the client sales call is recorded with the remote server during Step D while the client sales call is executed through the remote server. The at least one client sales call is the complete audio file of the client sales call that took place in between the sales agent and the potential client. For example, the client sales call that is completed by the specific agent account and the specific client contact is recorded by the present invention so that the recorded call can be further evaluated with respect to the parameters of the present invention. When the client sales call only results in a completed sale or an appointment scheduling, the client sales call is considered as a successful sale.

Figure 7:
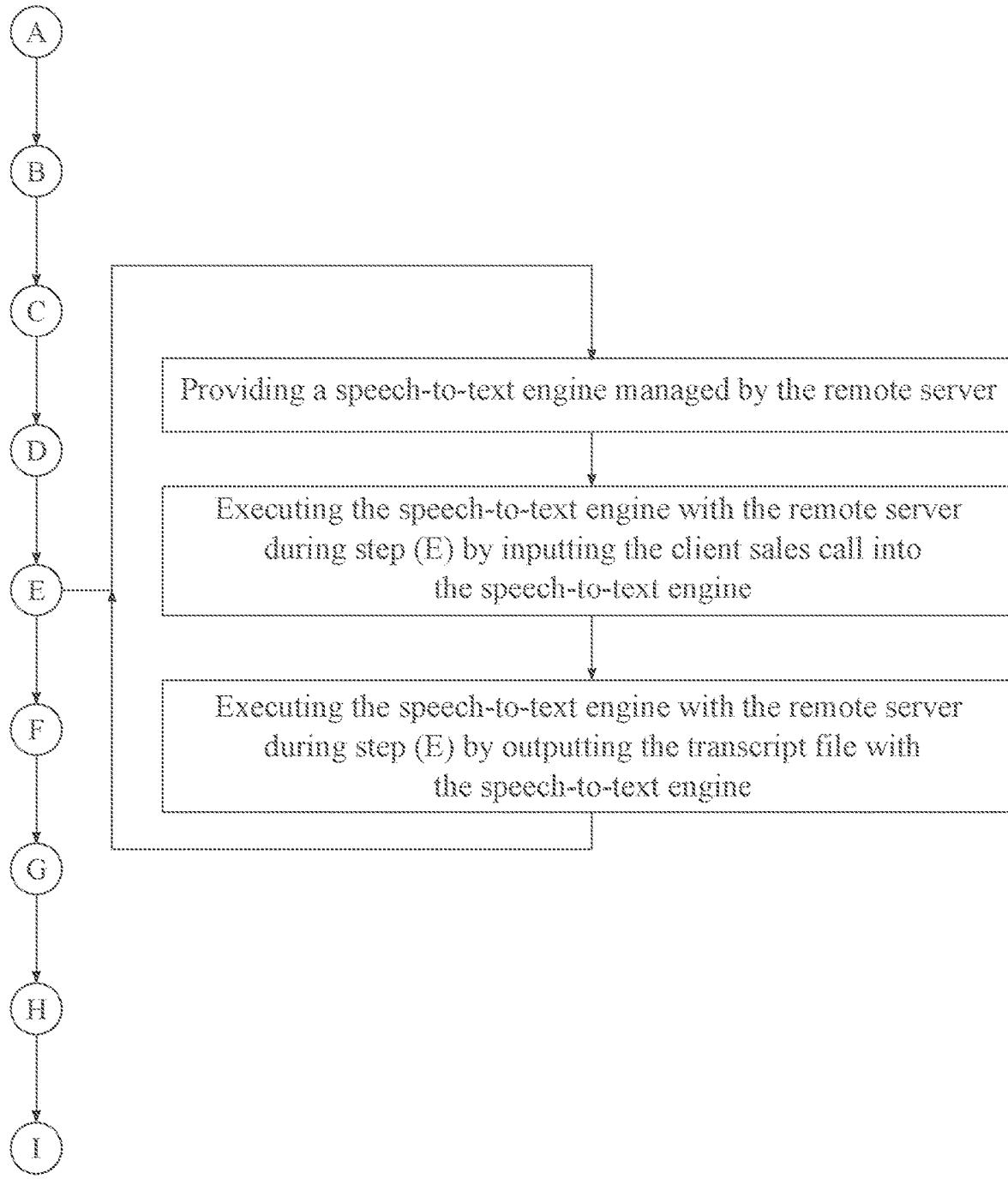
FIG. 7 is a flowchart illustrating a subprocess of extracting the transcript file of the present invention.

As can be seen in FIG. 7, the overall process continues by extracting a transcript file from the client sales call with the remote server (Step E). For example, when a conversation is automatically recorded and converted into a text file, the converted text file is known as the transcript file. More specifically, a speech-to-text engine is managed by the remote server and is able to convert audio data from the client sales call into textual data for the transcript file. Moreover, the overall process continues by executing the speech-to-text engine with the remote server during Step E by inputting the client sales call into the speech-to-text engine and outputting the transcript file with the speech-to-text engine. Thus, client sales call is converted into the transcript file because textual data from the transcript file is easier to analyze, compare, and contrast than audio data from the client sales call.

As can be seen in FIGS. 8-16, the overall process continues by executing the conversation critiquing engine with the remote server by inputting the transcript file and the sales script into the conversation critiquing engine (Step F) and then executing the conversation critiquing engine with the remote server by outputting a plurality of communication aspects of the client sales call with the conversation critiquing engine (Step G). The plurality of communication aspects is portions of a sales agent's conversation during the client sales call that can be graded by performance.

Figure 8:
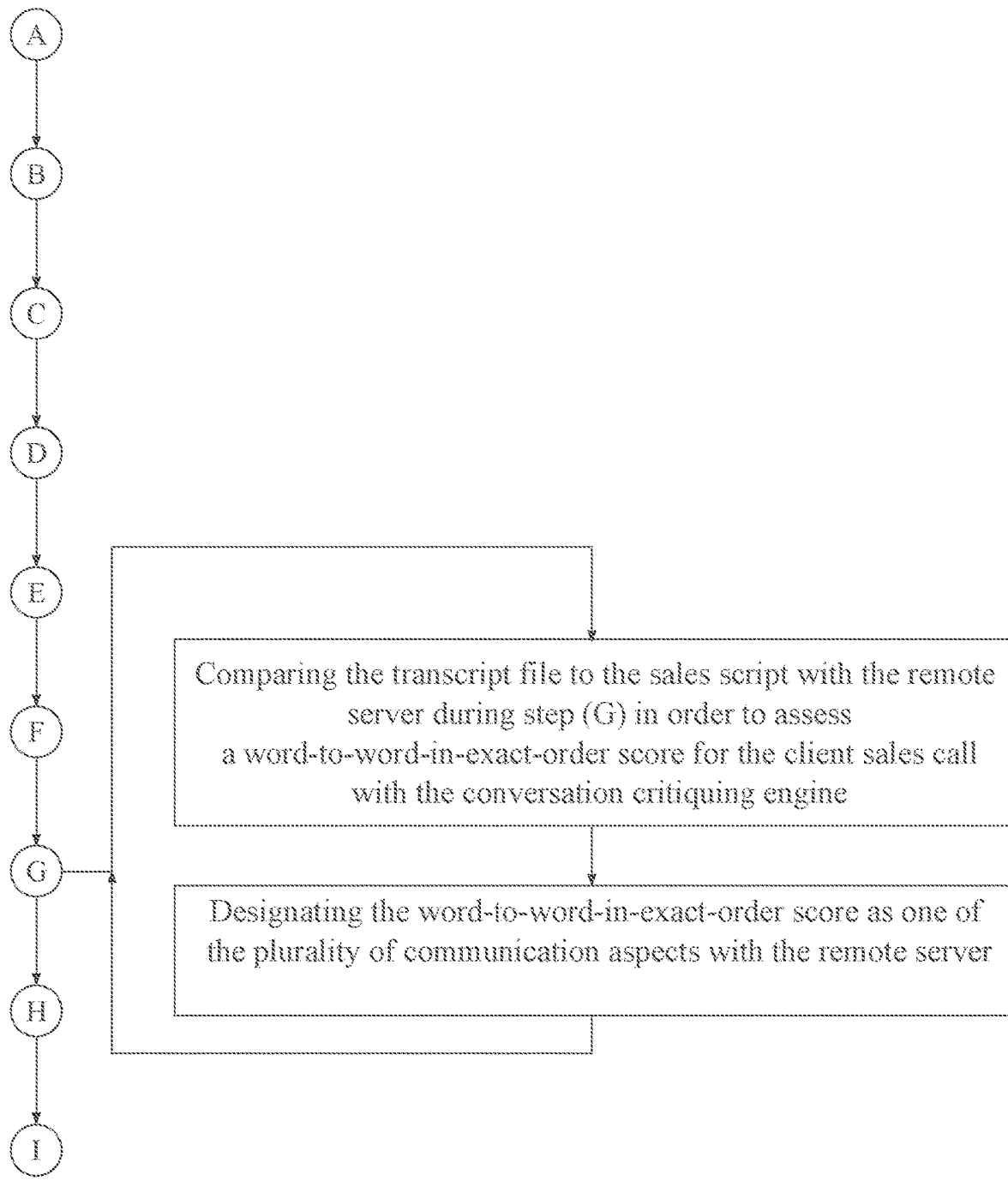
FIG. 8 is a flowchart illustrating a subprocess of executing the conversation critiquing engine of the present invention with respect to the word-to-word-in-exact-order score.

As can be seen in FIG. 8, the transcript file can be compared to the sales script with the remote server during Step G in order to assess a word-to-word-in-exact-order score for the client sales call with the conversation critiquing engine, wherein the word-to-word-in-exact-order score is designated as one of the plurality of communication aspects with the remote server. In other words, the remote server compares the transcript file to the sales script to determine that the sales agent follows the sales script verbatim and in exact sequence. Based on the outcome of the comparison, the remote server assesses the word-to-word-in-exact-order score. For example, when the sales script is completed with ten steps and the sales agent follows all ten steps verbatim and in exact sequence, the word-to-word-in-exact-order score is 100%. When the sales script is completed with ten steps and the sales agent follows only eight steps verbatim and in exact sequence, the word-to-word-in-exact-order score is 80%.

Figure 9:
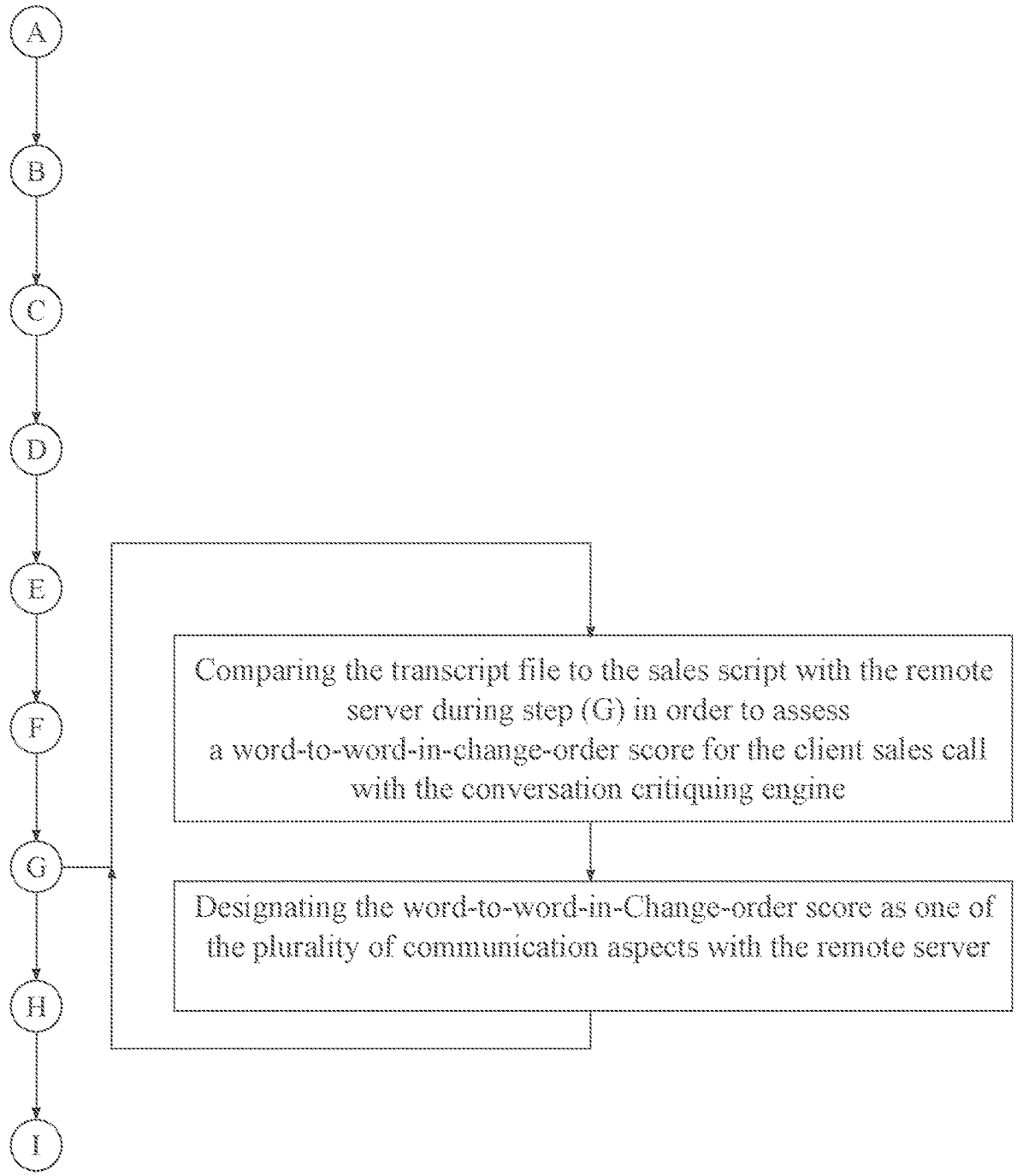
FIG. 9 is a flowchart illustrating a subprocess of executing the conversation critiquing engine of the present invention with respect to the word-to-word-in-changed-order score.

As can be seen in FIG. 9, the transcript file can be compared to the sales script with the remote server during Step G in order to assess a word-to-word-in-changed-order score for the client sales call with the conversation critiquing engine, wherein the word-to-word-in-changed-order score is designated as one of the plurality of communication aspects with the remote server. In other words, the remote server compares the transcript file to the sales script to determine that the sales agent follows the sales script verbatim and in changed sequence. Based on the outcome of the comparison, the remote server assesses the word-to-word-in-changed-order score. For example, when the sales script is completed with ten steps and the sales agent follows all ten steps verbatim and in changed sequence, the word-to-word-in-changed-order score is 100%. When the sales script is completed with ten steps and the sales agent follows only eight steps verbatim and in changed sequence, the word-to-word-in-changed-order score is 80%.

Figure 10:
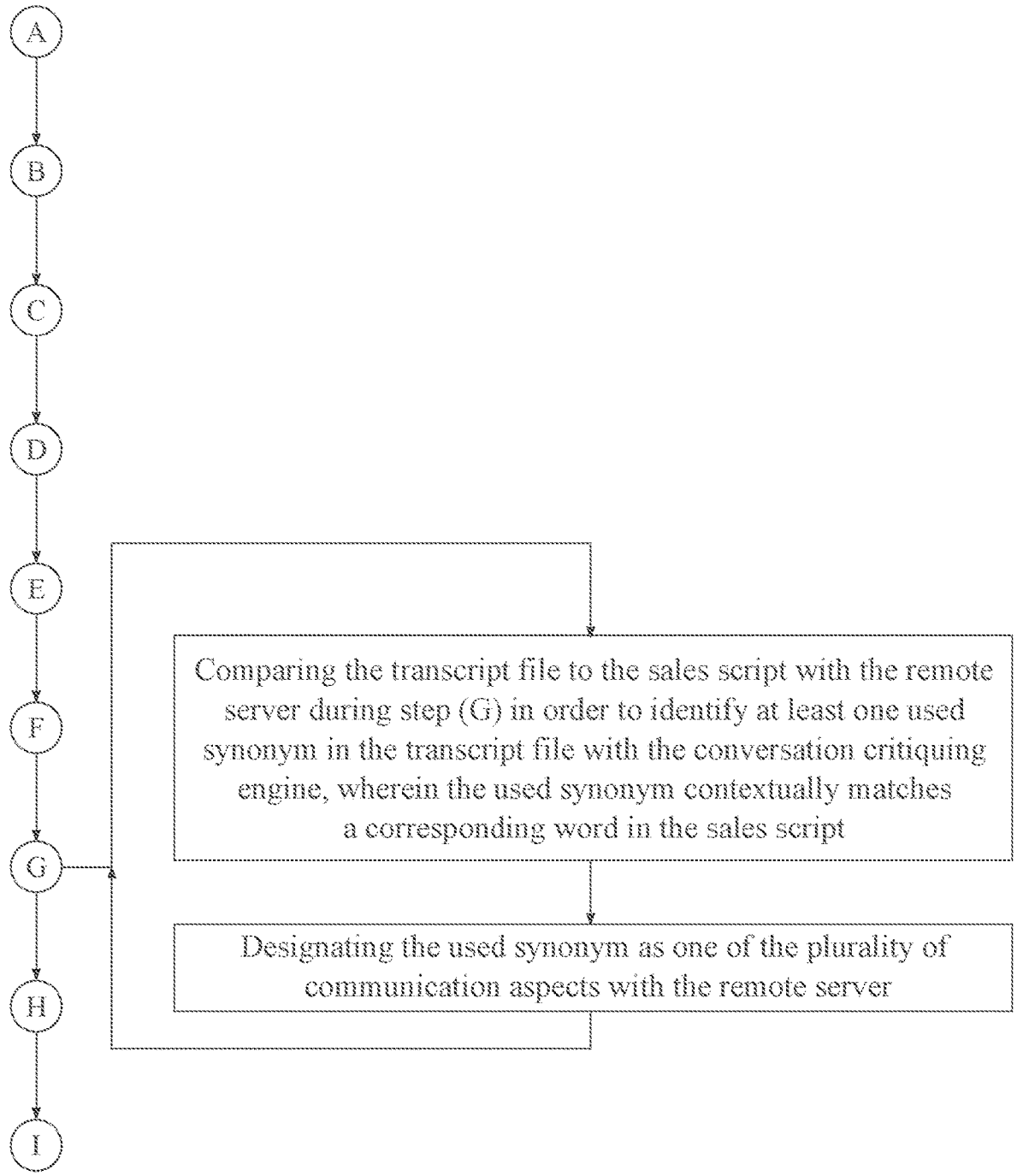
FIG. 10 is a flowchart illustrating a subprocess of executing the conversation critiquing engine of the present invention with respect to identifying the at least one used synonym.

As can be seen in FIG. 10, the transcript file can be compared to the sales script with the remote server during Step G in order to identify at least one used synonym in the transcript file with the conversation critiquing engine, wherein the used synonym contextually matches a corresponding word in the sales script. Furthermore, the used synonym is designated as one of the plurality of communication aspects with the remote server. More specifically, the remote server compares the transcript file to the sales script in order to identify any synonyms that contextually match with the corresponding word in the sales script. Based on the outcome of the comparison, the remote server is able to output a list of synonyms and usage frequency of the synonym. For example, when the sales script uses the word "house" and the sales agent uses the word "home" instead of using the word "house," the remote server identifies that the word "home" contextually matches to the word "house." Then, the remote server is also able to determine the usage frequency of the word "house."

Figure 11:
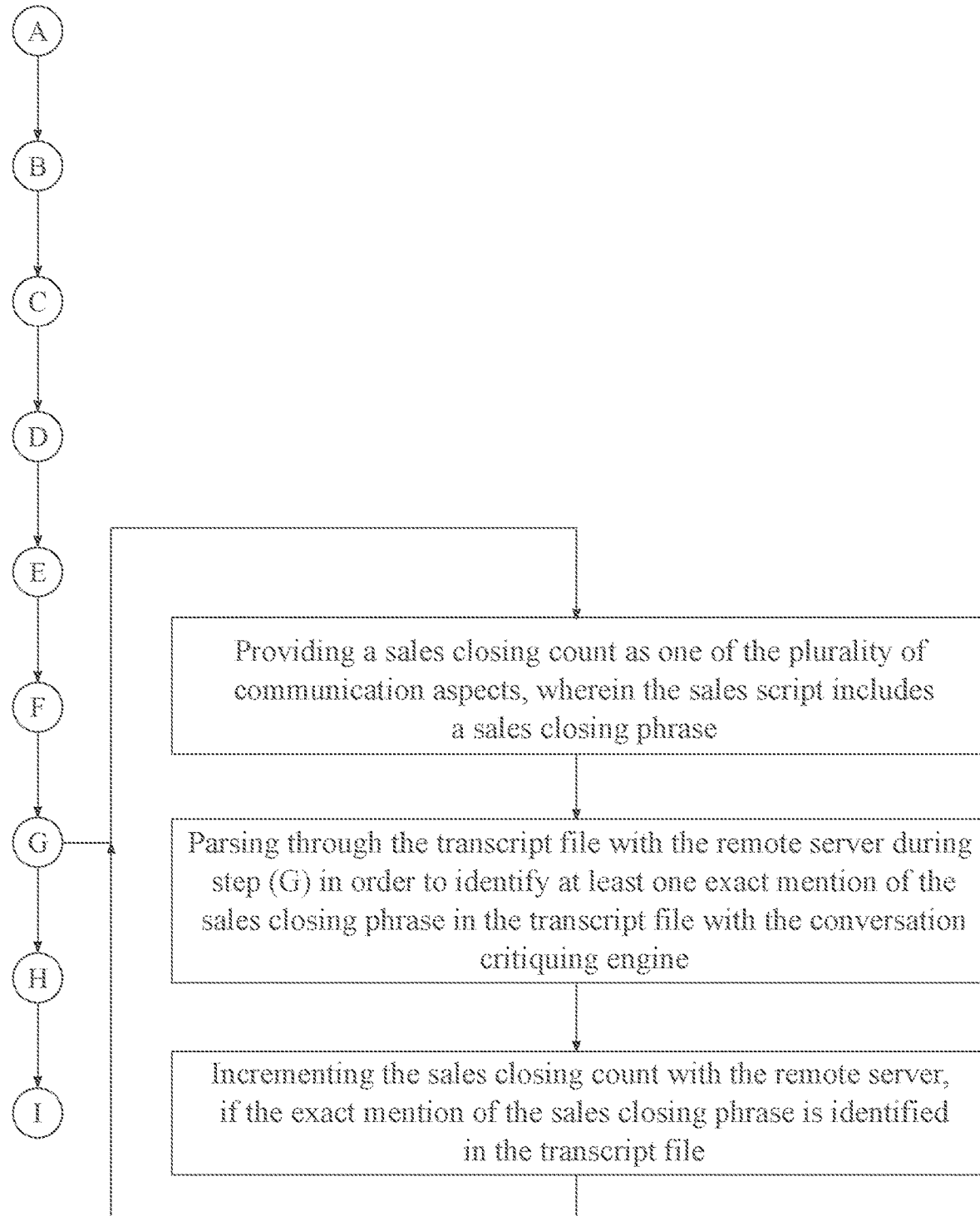
FIG. 11 is a flowchart illustrating a subprocess of executing the conversation critiquing engine of the present invention with respect to the at least one exact mention of the sales closing count.
Figure 12:
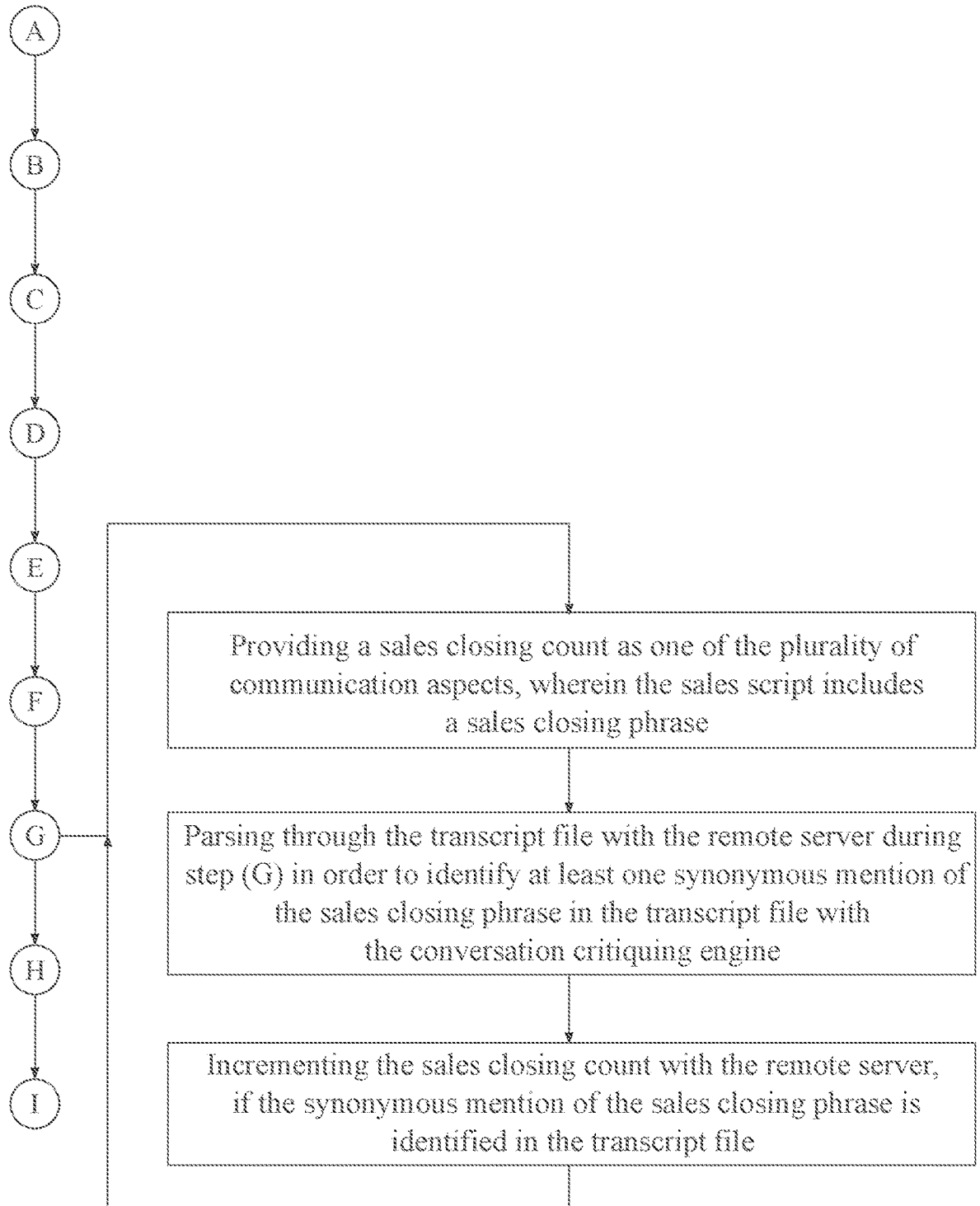
FIG. 12 is a flowchart illustrating a subprocess of executing the conversation critiquing engine of the present invention with respect to the at least one synonymous mention of the sales closing count.

As can be seen in FIG. 11 and FIG. 12, a sales closing count is provided as one of the plurality of communication aspects, wherein the sales script includes a sales closing phrase. The sales closing phrase can include, but is not limited to, scheduling a follow-up call, scheduling an appointment, receiving a payment or any other similar conversational phase that can result the successful sale. For example, "would you like to pay the invoice to move forward?" can be listed as one of the sales closing phrase within the sales script. In order to finalize the sales closing count, the remote server parses through the transcript file with during Step G in order to identify at least one exact mention of the sales closing phrase in the transcript file with the conversation critiquing engine. Then, the remote server increments the sales closing count with the remote server, if the exact mention of the sales closing phrase is identified in the transcript file. For example, when the sales agent tells the potential client to make a payment by suggesting "would you like to pay the invoice to move forward?" during the client sales call, the sales closing count is calculated as one since sales agent suggestion "would you like to pay the invoice to move forward?" exactly matches the sales closing phrase "would you like to pay the invoice to move forward?". In addition, the remote server parses through the transcript file with during Step G in order to identify at least one synonymous mention of the sales closing phrase in the transcript file with the conversation critiquing engine. Then, the remote server increments the sales closing count with the remote server, if the at least one synonymous mention of the sales closing phrase is identified in the transcript file. For example, when the sales agent tells the potential client to make a payment by suggesting "do you want to move forward by paying the invoice?" during the client sales call, the sales closing count is calculated as one since sales agent suggestion "do you want to move forward by paying the invoice?" has a similar meaning as the sales closing phrase "would you like to pay the invoice to move forward?".

Figure 13:
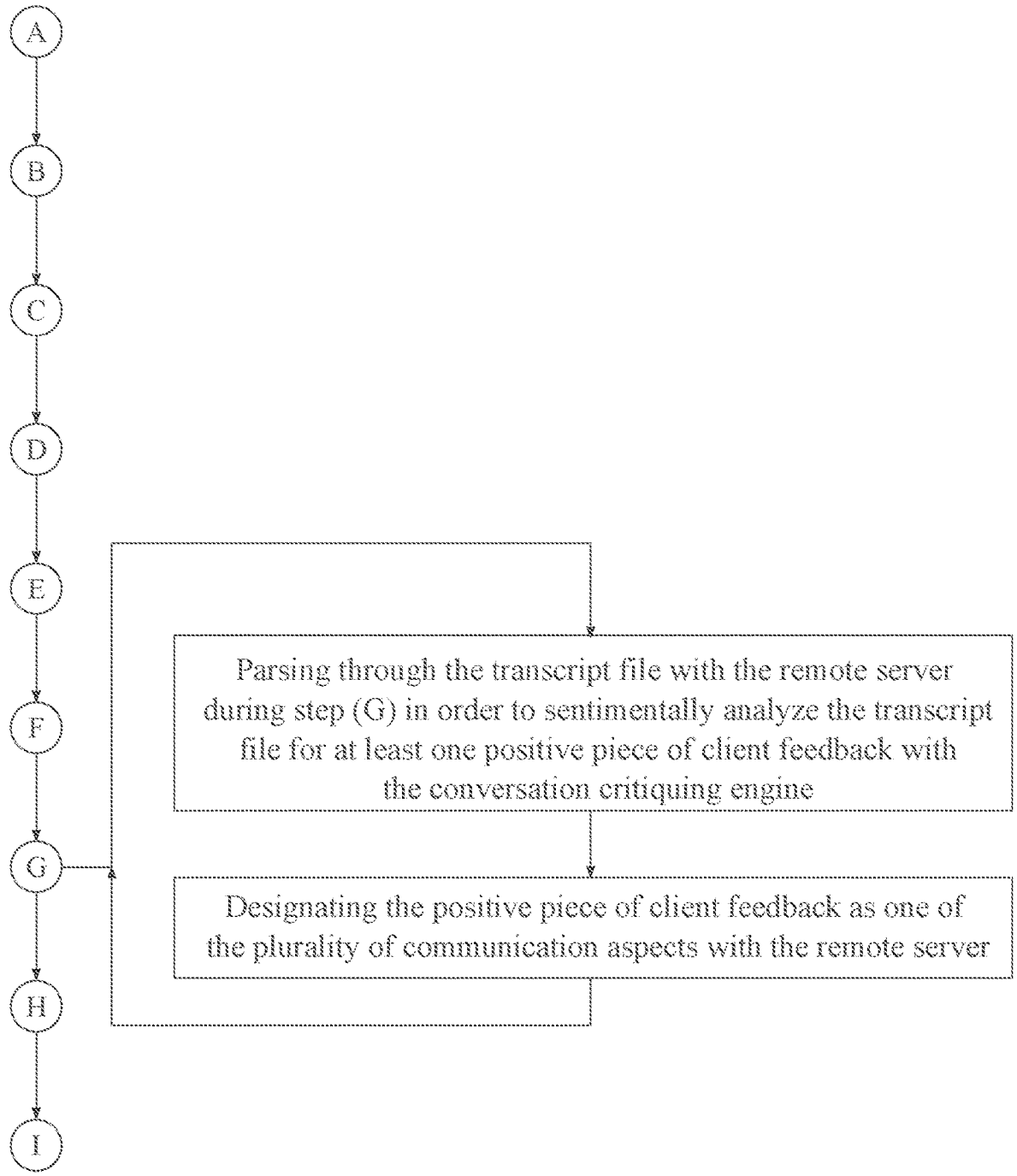
FIG. 13 is a flowchart illustrating a subprocess of executing the conversation critiquing engine of the present invention with respect to the positive piece of client feedback.

As can be seen in FIG. 13, the remote server can parse the transcript file during Step G in order to sentimentally analyze the transcript file for at least one positive piece of client feedback with the conversation critiquing engine, wherein the positive piece of client feedback can be designated as one of the plurality of communication aspects with the remote server. More specifically, complimenting words such as thank you, well done, good job, excellent, or any other similar complimenting words or phrases can identify as the positive piece of client feedback with the conversation critiquing engine. Resultantly, the remote server is able to determine the cumulative number of positive pieces of client feedback with the conversation critiquing engine.

Figure 14:
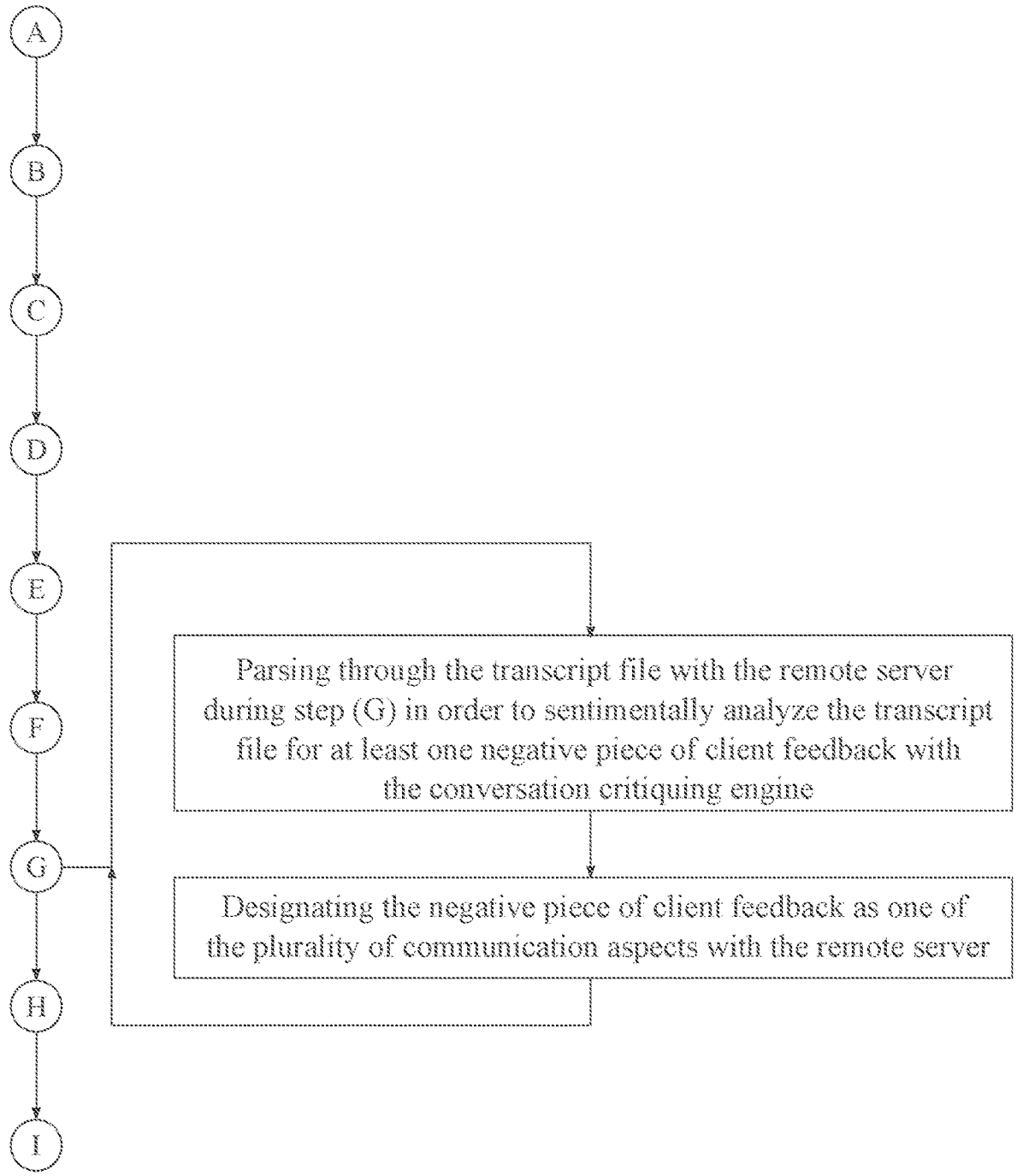
FIG. 14 is a flowchart illustrating a subprocess of executing the conversation critiquing engine of the present invention with respect to the negative piece of client feedback.

As can be seen in FIG. 14, the remote server can parse the transcript file during Step G in order to sentimentally analyze the transcript file for at least one negative piece of client feedback with the conversation critiquing engine, wherein the negative piece of client feedback can be designated as one of the plurality of communication aspects with the remote server. More specifically, adverse words/phrases such as offensive language or any other similar insulting words or phrases can identify as the negative piece of client feedback with the conversation critiquing engine. Resultantly, the remote server is able to determine the cumulative number of negative pieces of client feedback with the conversation critiquing engine.

Figure 15:
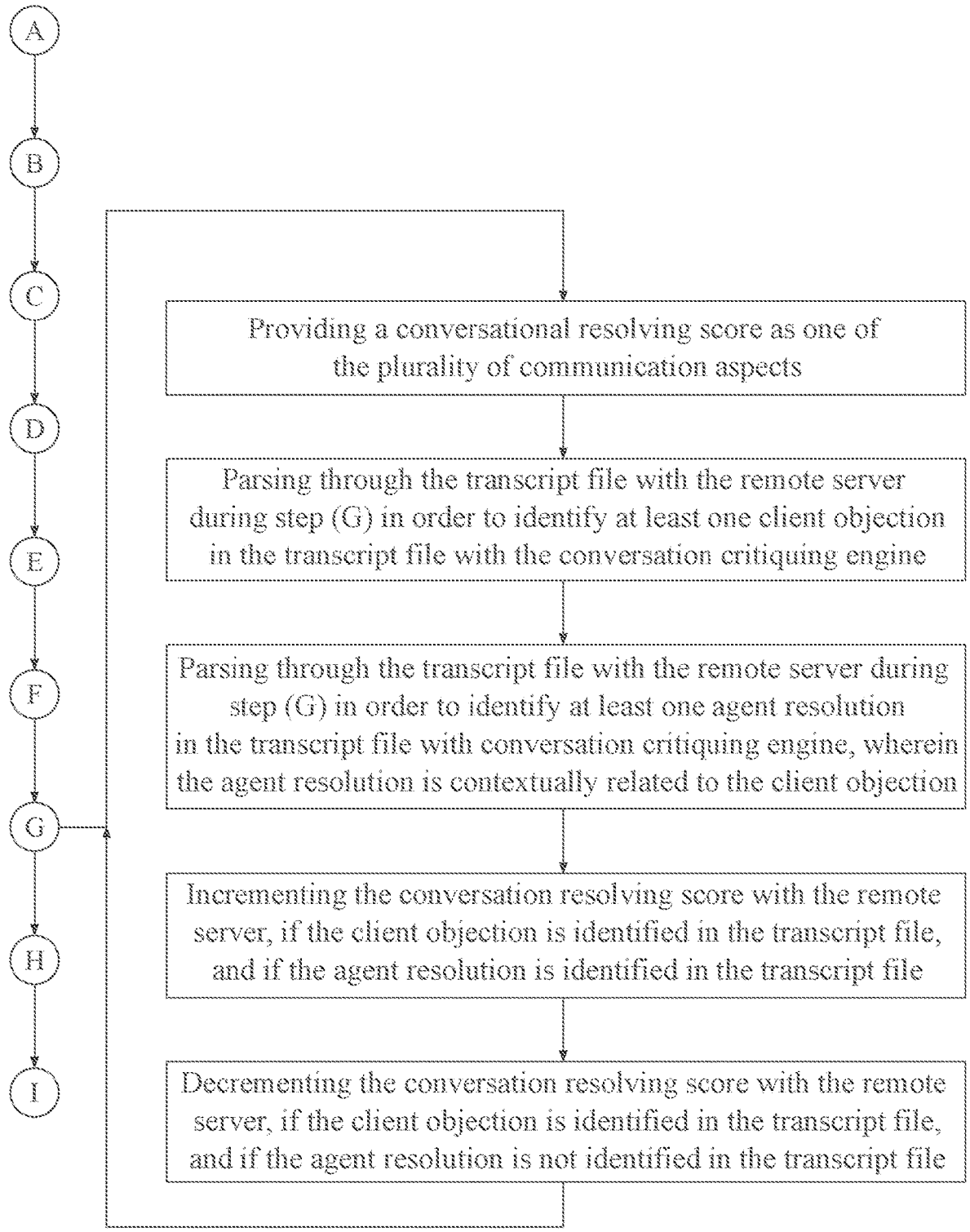
FIG. 15 is a flowchart illustrating a subprocess of executing the conversation critiquing engine of the present invention with respect to the conversational resolving score.

As can be seen in FIG. 15, a conversational resolving score as one of the plurality of communication aspects so that the sales can be graded with respect to the ability of resolving challenges. More specifically, the remote server parses through the transcript file during Step G in order to identify at least one client objection in the transcript file with the conversation critiquing engine. The remote server simultaneously parses through the transcript file during Step G in order to identify at least one agent resolution in the transcript file with conversation critiquing engine, wherein the agent resolution is contextually related to the client objection. The remote server then increments the conversation resolving score, if the client objection is identified in the transcript file, and if the agent resolution is identified in the transcript file thus indicating a positive conclusion to the sales agent. Similarly, the remote server decrements the conversation resolving score with the remote server, if the client objection is identified in the transcript file, and the agent resolution is not identified in the transcript file. For example, when the sales agent is able to provide an exact quotation for a specific service that is requested by the client, the conversation resolving score is incremented. When the sales agent is not able to provide an exact quotation for a specific service that is requested by the client, the conversation resolving score is decremented.

Figure 16:
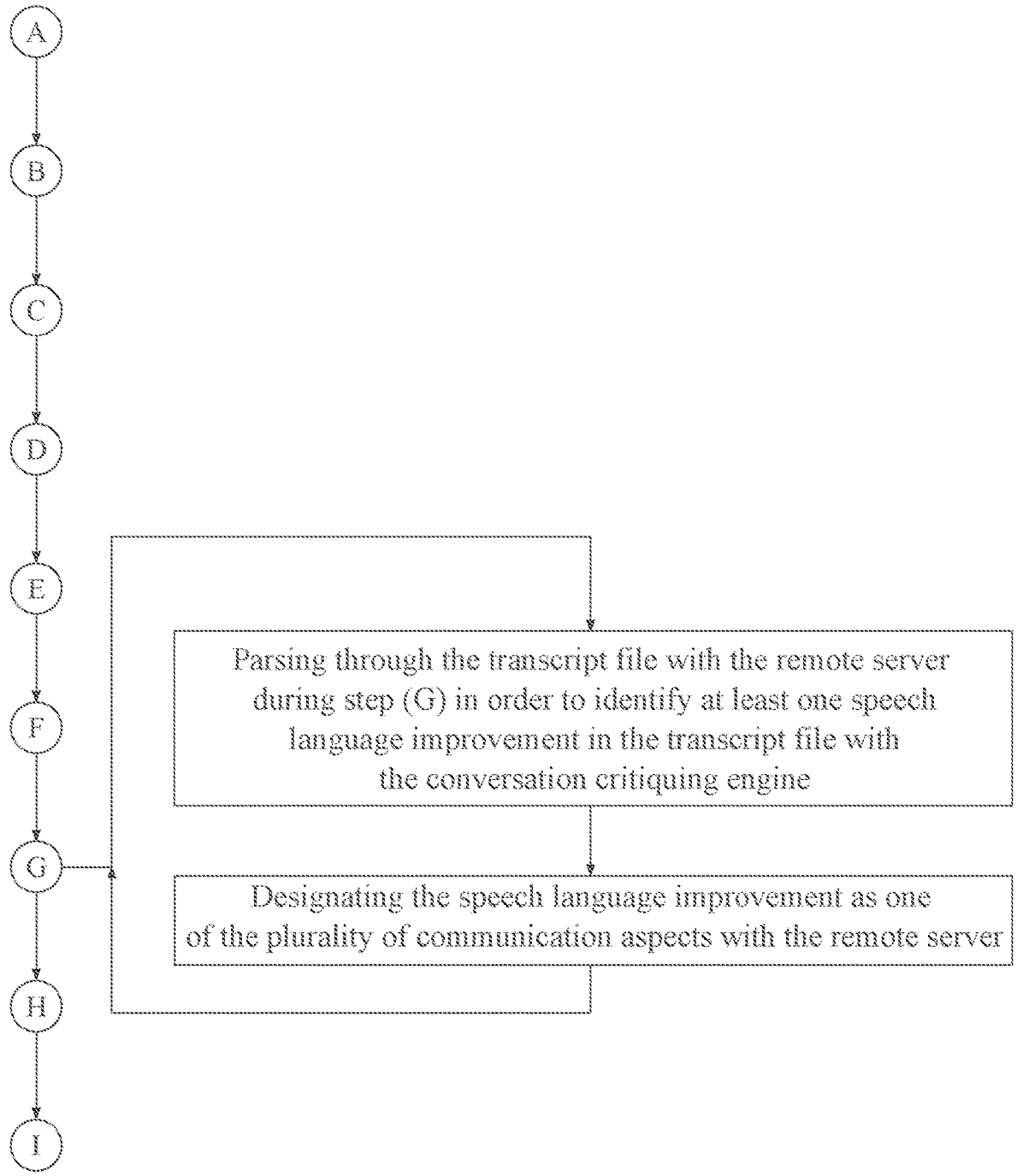
FIG. 16 is a flowchart illustrating a subprocess of executing the conversation critiquing engine of the present invention with respect to the speech language improvement.

As can be seen in FIG. 16, the remote server can parse the transcript file during Step G in order to identify at least one speech language improvement with the conversation critiquing engine, wherein the at least one speech language improvement can be designated as one of the plurality of communication aspects with the remote server. More specifically, alternative words/phrases that are not listed in the sales script can be identified with the conversation critiquing engine in order to further expand the sales script which in return improves the vocabulary of the sales agent.

Figure 4:
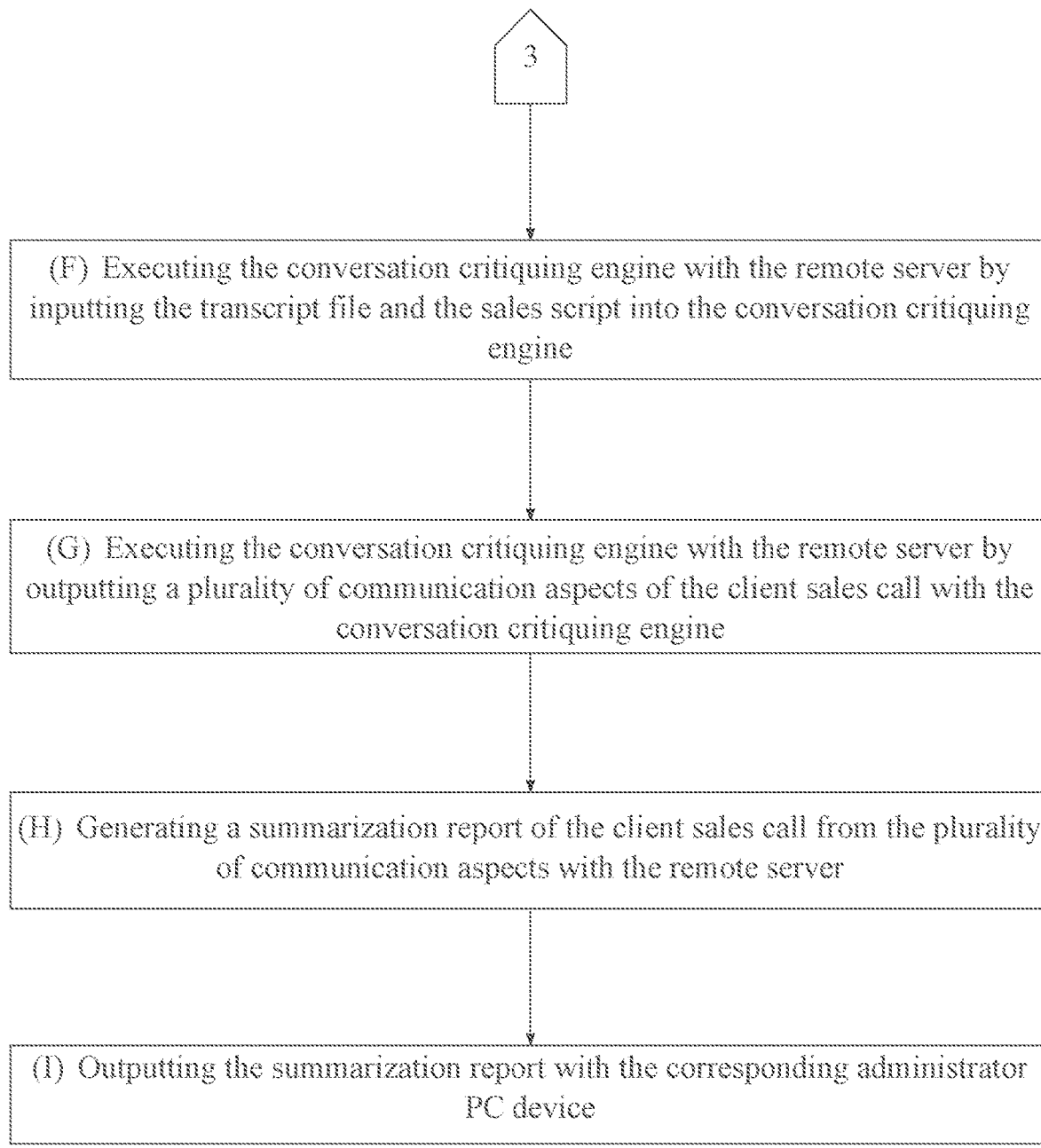
FIG. 4 is a continuation of FIG. 3.
Figure 17:
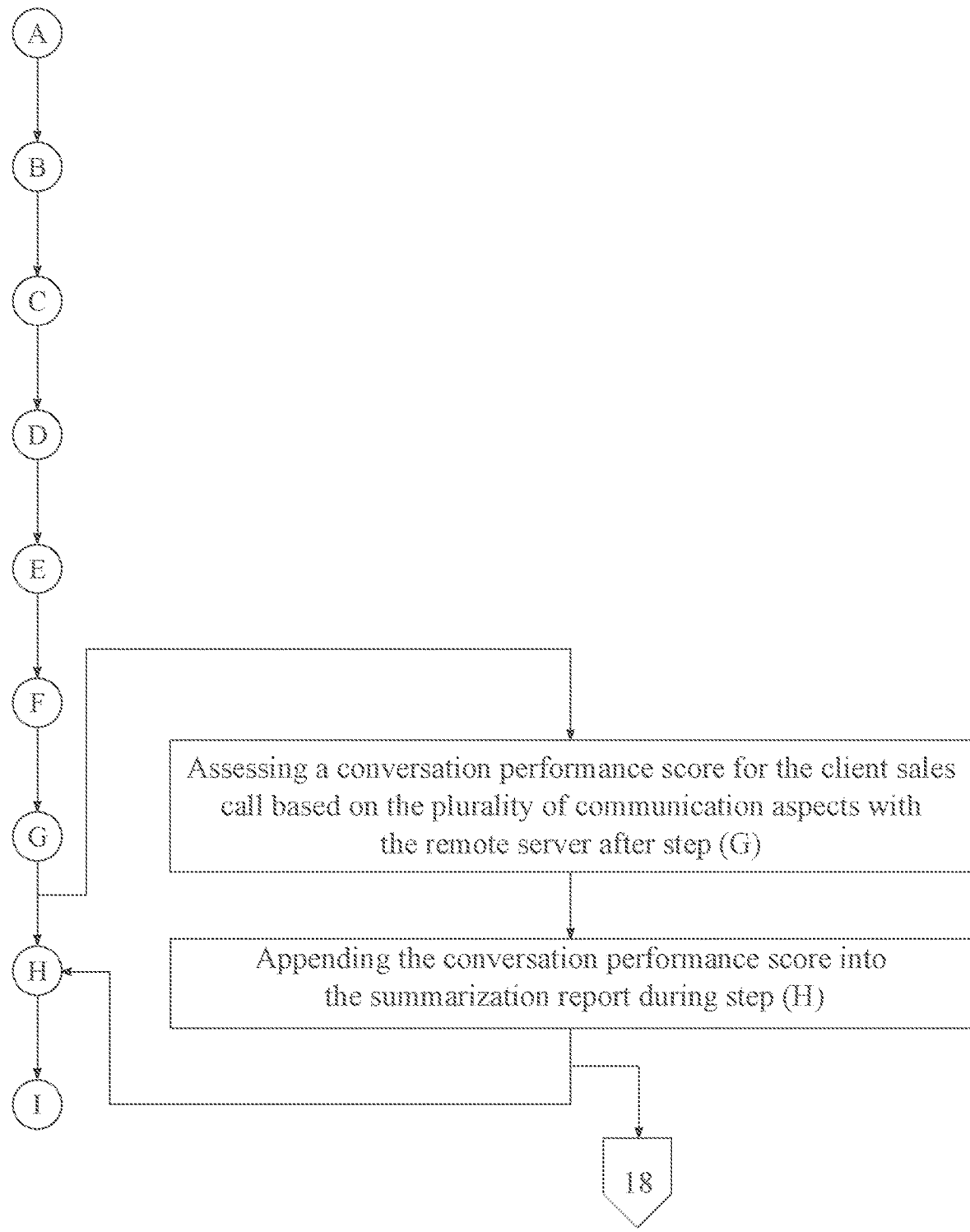
FIG. 17 is a flowchart illustrating a subprocess of assessing the conversation performance score of the present invention.

As can be seen in FIG. 4 and FIG. 17, the overall process continues by generating a summarization report of the client sales call from the plurality of communication aspects with the remote server (Step H). More specifically, the remote server assesses a conversation performance score for the client sales call based on the plurality of communication aspects after Step G so that the conversation performance score can be appended into the summarization report during Step H. The conversational performance score is a total score for each of the plurality of agent accounts, wherein the total score is calculated with the plurality of communication aspects. The summarization report is a visual report and represents the conversational performance score.

Figure 18:
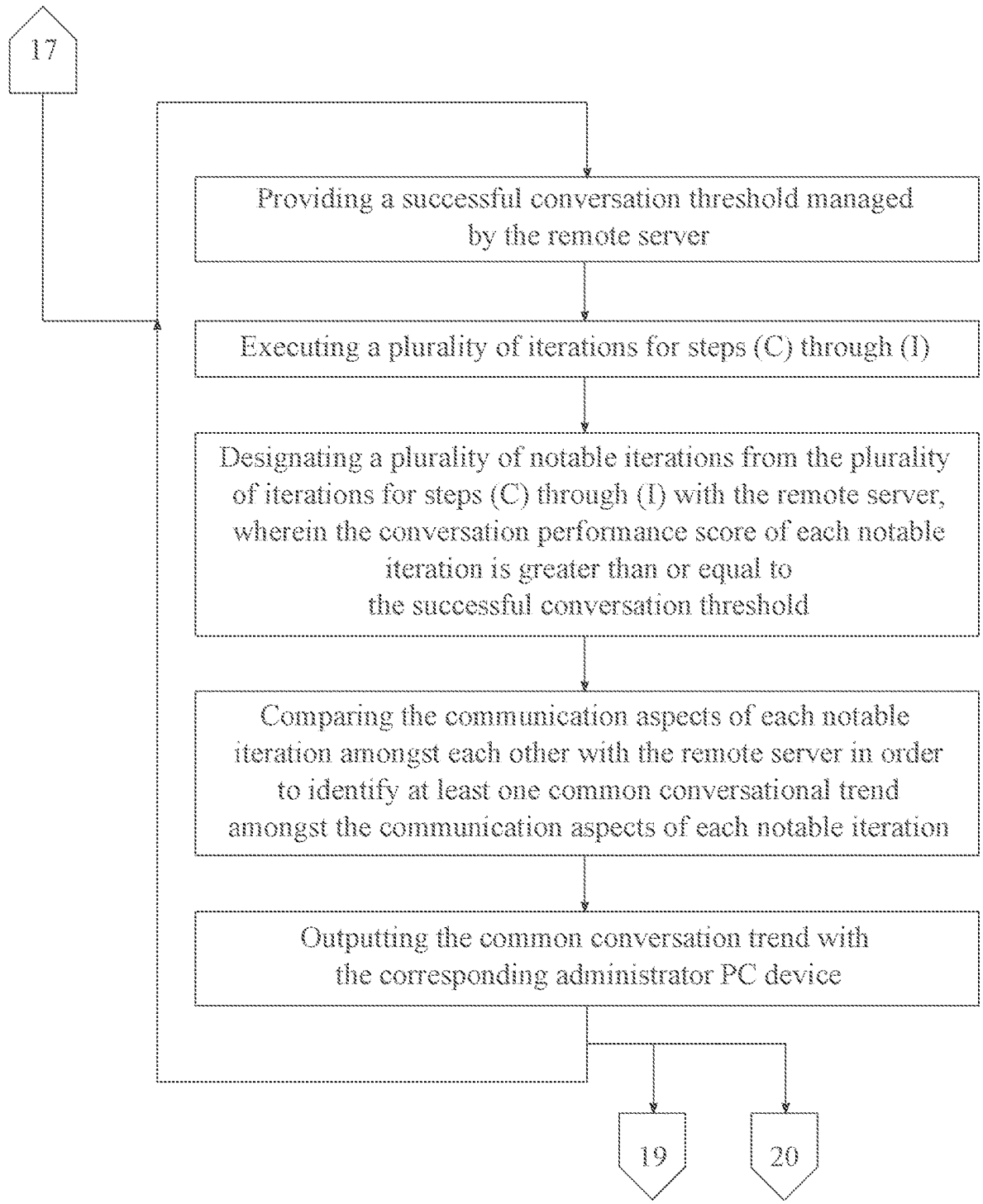
FIG. 18 is a flowchart illustrating a subprocess of outputting the common conversation trend of the present invention.

As can be seen in FIG. 4 and FIG. 18, the overall process concludes by outputting the summarization report with the corresponding administrator PC device (Step I). In other words, the administrator account is able to view the summarization report with the corresponding administrator PC device to determine the performance of each sales agent. Furthermore, the summarization report can be used as a teaching/training guide that implements recommendations so that low performing sales agents can be trained effectively. Furthermore, the summarization report can also be used to provide effective suggestions and recommendations to sales agents.

Figure 19:
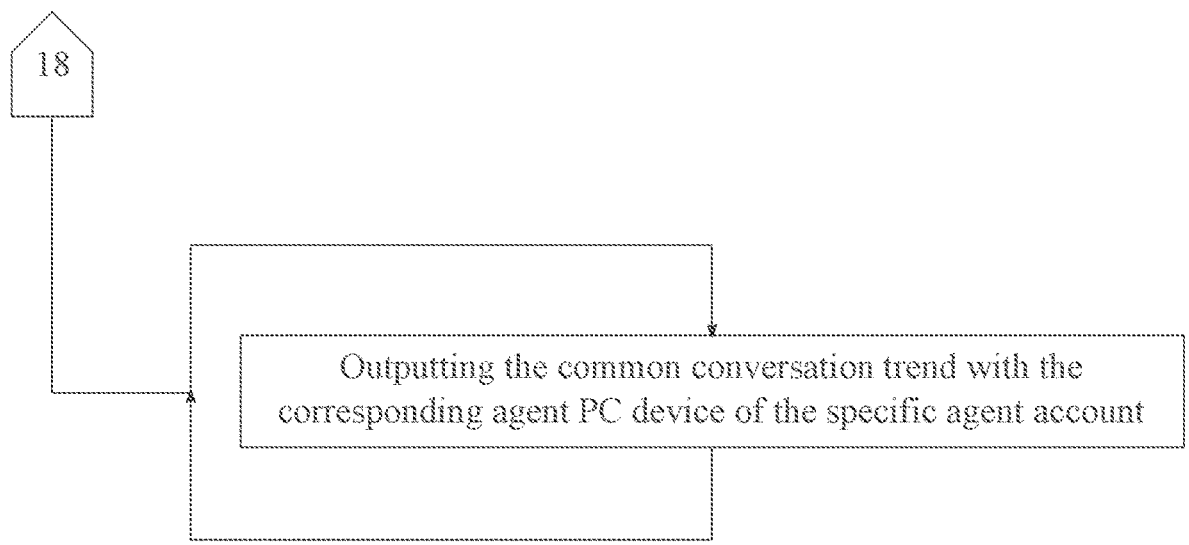
FIG. 19 is a flowchart illustrating a subprocess of outputting the common conversation trend of the present invention with the corresponding agent PC device.
Figure 20:
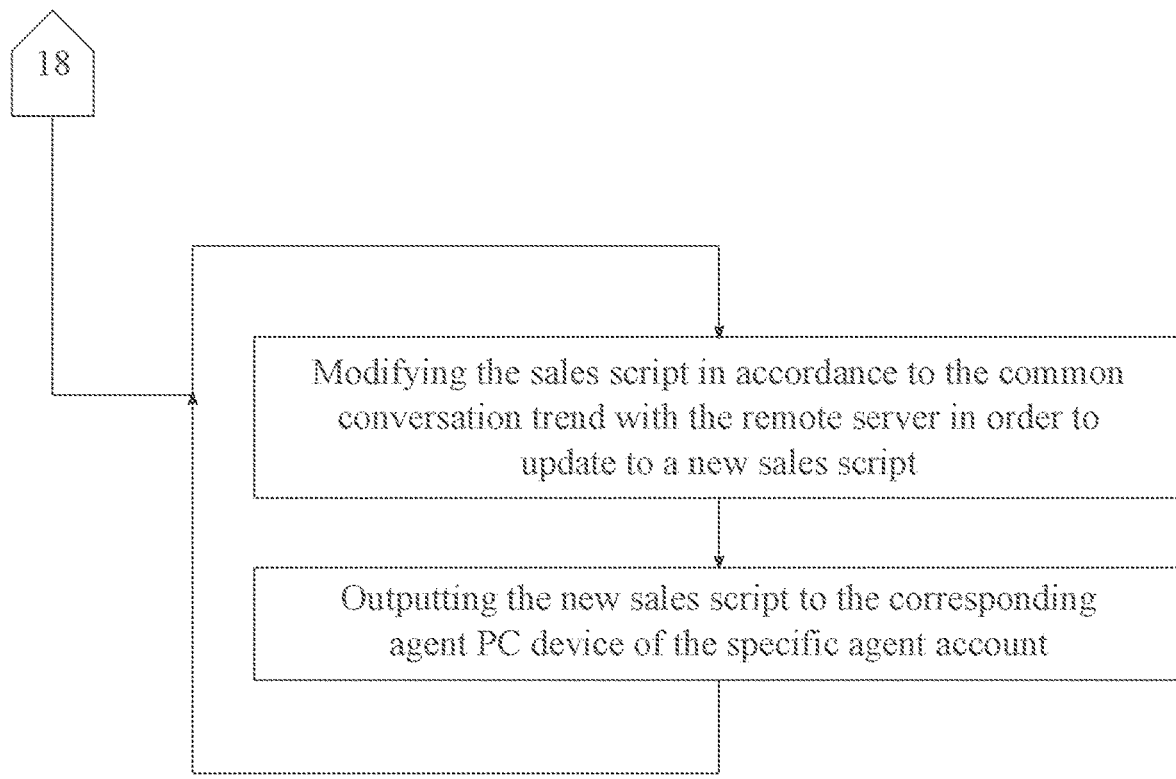
FIG. 20 is a flowchart illustrating a subprocess of outputting the new sales script with the common conversation trend of the present invention.

As can be seen in FIGS. 18-20, the overall process provides a successful conversation threshold managed by the remote server. The successful conversation threshold is a baseline limit that is assigned for the successful sale with the remote server so that the successful sales can be differentiated from the unsuccessful sales with respect to the conversation performance score. The overall process continuously executes a plurality of iterations for Step C through Step I in order to designate a plurality of notable iterations from the plurality of iterations, wherein the conversation performance score of each notable iteration is greater than or equal to the successful conversation threshold. The plurality of communication aspects of each notable iteration is compared amongst each other with the remote server in order to identify at least one common conversational trend amongst the communication aspects of each notable iteration. For example, the common conversational trend can be usage of word "excellent" with respect to the positive piece of client feedback that is identified through the plurality of notable iterations. The common conversation trend is then outputted with the corresponding administrator PC device so that the administrator account can modify the sales script. More specifically, the sales script is modified in accordance with the common conversation trend with the remote server in order to update to a new sales script. Then, the new sales script is outputted to the corresponding agent PC device of the specific agent account so that upcoming client sales calls can result in a higher client conversation rate. Furthermore, the common conversation trend is also outputted with the corresponding agent PC device of the specific agent account so that the sales agent can get educated how to efficiently conduct upcoming client sales calls.

Figure 21:
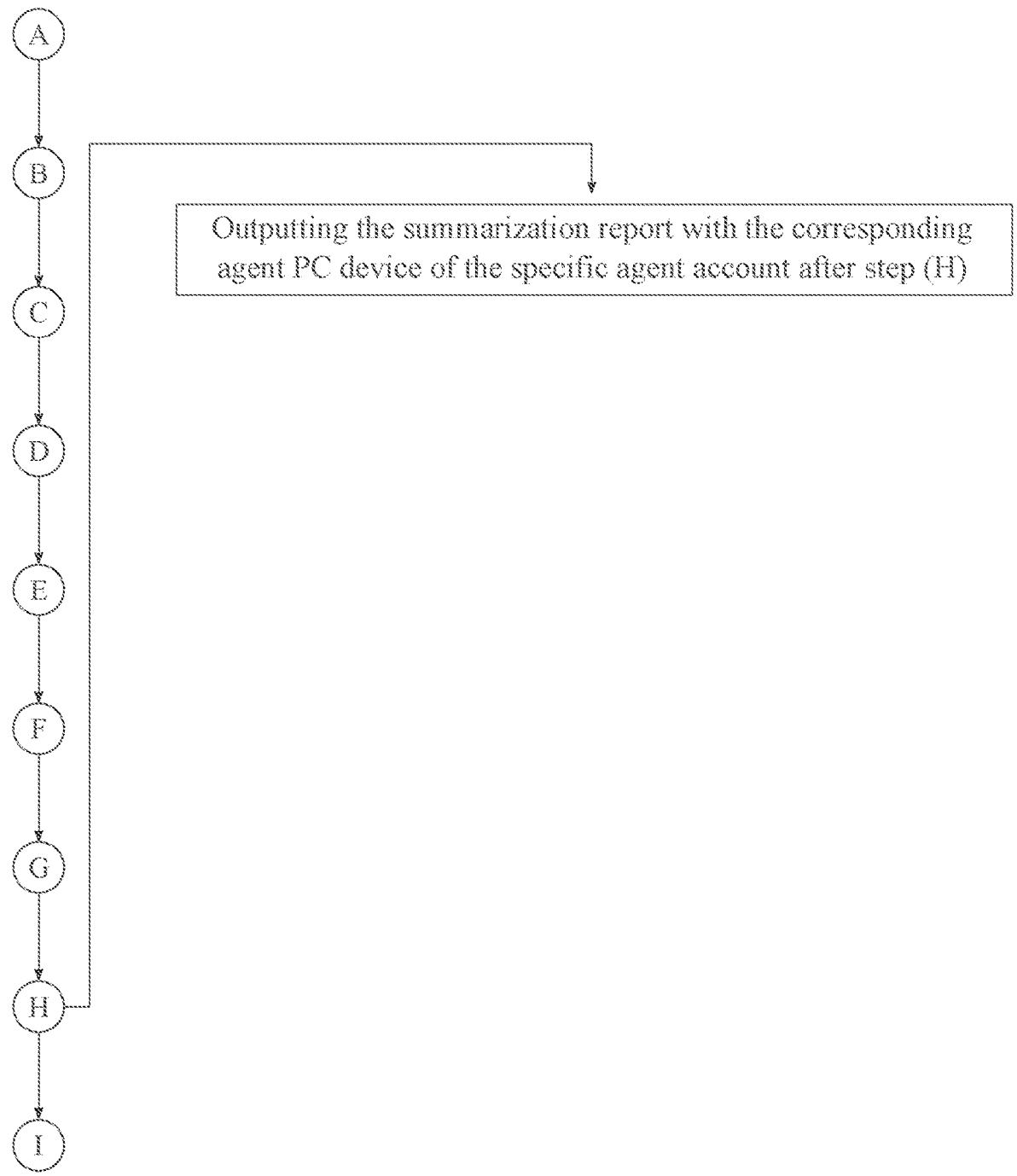
FIG. 21 is a flowchart illustrating a subprocess of outputting the summarization report of the present invention with the specific agent account.

As can be seen in FIG. 21, the summarization report is also outputted with the corresponding agent PC device of the specific agent account after Step H. In other words, the summarization report functions as a customized report of the specific agent account so that the corresponding sales agent can identify their weakness and strength with regards to the client sales call. For example, when the word-to-word-in-exact order score is low within the summarization report, the sales agent can easily identify that is a weakness within the client sales call. Then, the sales agent can train or mentally prepare to improve the word-to-word-in-exact order score for the upcoming client sales call.

Figure 22:
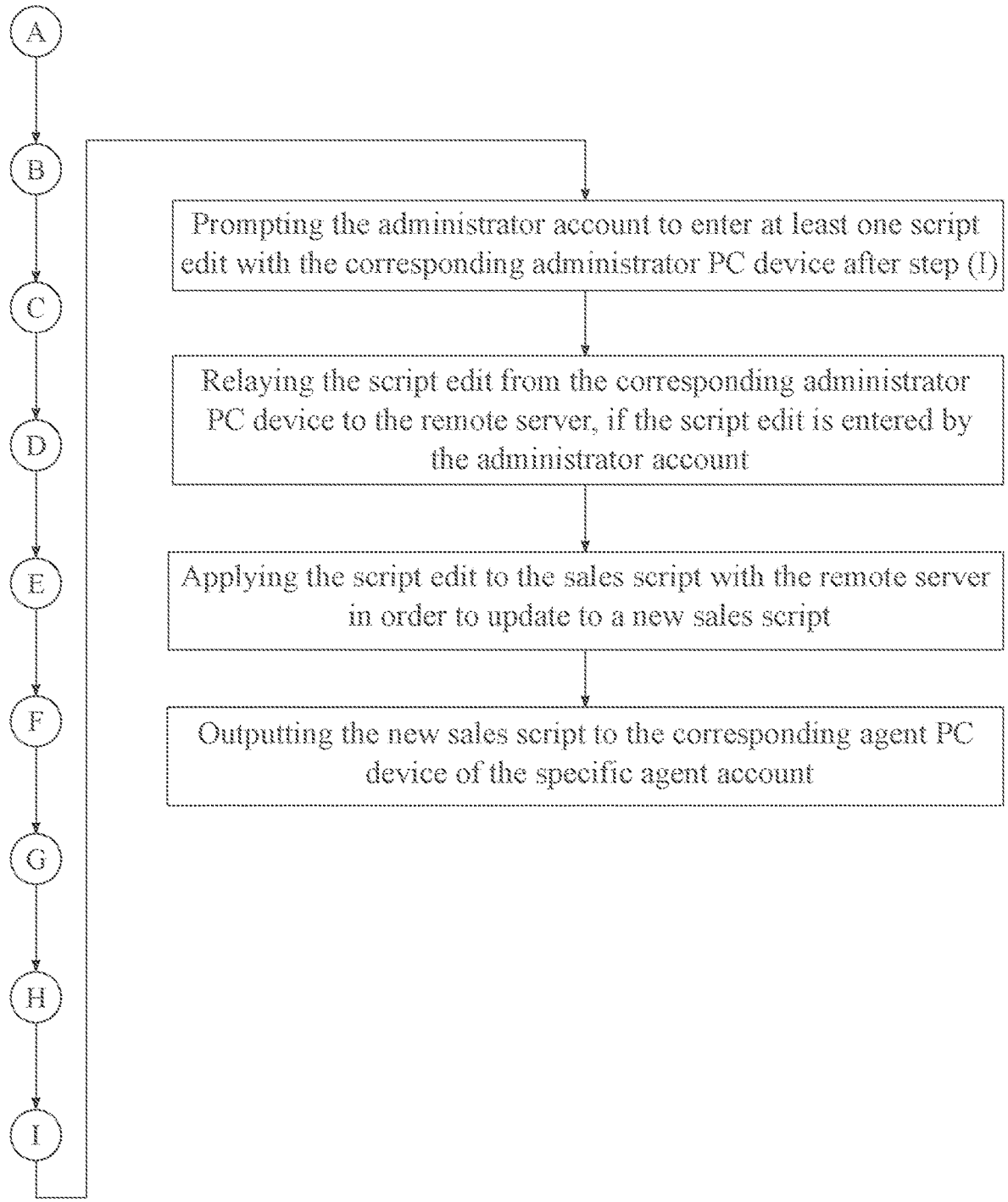
FIG. 22 is a flowchart illustrating a subprocess of outputting the new sales script of the present invention with the specific agent account.

As can be seen in FIG. 22, the overall process continues by prompting the administrator account to enter at least one script edit with the corresponding administrator PC device after Step I. The script edit is potential changes that can be implemented to the existing sales scripts based upon the summarization report. The script edit from the corresponding administrator PC device is then relayed to the remote server, if the script edit is entered by the administrator account. The script edit is then applied to the sales script with the remote server in order to update to a new sales script, wherein the new sales script is outputted to the corresponding agent PC device of the specific agent account. More specifically, the new sales script functions as an updated and efficient sales completion guide in comparison to the previously issued sales script. As a result, the sales agent is able to optimize and streamline their client sales call through a high client conversation rate.

Although the invention has been explained in relation to its preferred embodiment, it is to be understood that many other possible modifications and variations can be made without departing from the spirit and scope of the invention as hereinafter claimed.

What is claimed is:

1. A method of improving communication skills for a high client conversation rate, the method comprising the steps of:
    (A) providing at least one administrator account and a plurality of agent accounts managed by at least one remote server, wherein the administrator account is associated with a corresponding administrator personal computing (PC) device, and wherein each agent account is associated with a corresponding agent PC device;
    (B) providing a conversation critiquing engine managed by the remote server,
    (C) assigning a sales script to at least one specific agent account with the remote server, if the administrator account selects the sales script for the specific agent account, wherein the specific agent account is from the plurality of agent accounts;
    (D) recording at least one client sales call by the specific agent account with the remote server;
    (E) extracting a transcript file from the client sales call with the remote server,
    (F) executing the conversation critiquing engine with the remote server by inputting the transcript file and the sales script into the conversation critiquing engine;
    (G) executing the conversation critiquing engine with the remote server by outputting a plurality of communication aspects of the client sales call with the conversation critiquing engine;
    (H) generating a summarization report of the client sales call from the plurality of communication aspects with the remote server; and
    (I) outputting the summarization report with the corresponding administrator PC device;
    sequentially executing steps (C) through (I) as a series of computer-executable instructions with pieces of computing hardware, wherein the pieces of computing hardware include the corresponding administrator PC device, the corresponding agent PC device, and the remote server,
    providing a sales closing count as one of the plurality of communication aspects, wherein the sales script includes a sales closing phrase;
    parsing through the transcript file with the remote server during step (G) in order to identify at least one synonymous mention of the sales closing phrase in the transcript file with the conversation critiquing engine;
    incrementing the sales closing count with the remote server, if the synonymous mention of the sales closing phrase is identified in the transcript file;

assessing a conversation performance score for the client sales call based on the plurality of communication aspects with the remote server after step (G);

appending the conversation performance score into the summarization report during step (H);

providing a successful conversation threshold managed by the remote server;

executing a plurality of iterations for steps (C) through (I);

designating a plurality of notable iterations from the plurality of iterations for steps (C) through (I) with the remote server, wherein the conversation performance score of each notable iteration is greater than or equal to the successful conversation threshold;

comparing the communication aspects of each notable iteration amongst each other with the remote server in order to identify at least one common conversational trend amongst the communication aspects of each notable iteration; and outputting the common conversation trend with the corresponding administrator PC device.

2. The method as claimed in claim 1 comprising the steps of:

prompting the administrator account to assign the sales script to the specific agent account with the corresponding administrator PC device during step (C);

relaying the sales script from the corresponding administrator PC device, through the remote server, and to the corresponding agent PC device of the specific agent account, if the sales script is selected to be assigned to the specific agent account by the administrator account; and outputting the sales script to the corresponding agent PC device of the specific agent account.

3. The method as claimed in claim 1 comprising the steps of:

providing a plurality of client contacts managed by the remote server;

prompting the specific agent account to make the client sales call for at least one specific client contact with the corresponding agent PC device before step (D), wherein the specific client contact is from the plurality of client contacts;

executing the client sales call between the specific agent account and the specific client contact through the remote server, if the client sales call for the specific client contact is selected to be made by the specific agent account; and recording the client sales call with the remote server during step (D) as the client sales call is executed through the remote server.

4. The method as claimed in claim 1 comprising the steps of:

providing a speech-to-text engine managed by the remote server;

executing the speech-to-text engine with the remote server during step (E) by inputting the client sales call into the speech-to-text engine; and executing the speech-to-text engine with the remote server during step (E) by outputting the transcript file with the speech-to-text engine.

5. The method as claimed in claim 1 comprising the steps of:

comparing the transcript file to the sales script with the remote server during step (G) in order to assess a word-to-word-in-exact-order score for the client sales call with the conversation critiquing engine; and designating the word-to-word-in-exact-order score as one of the plurality of communication aspects with the remote server.

6. The method as claimed in claim 1 comprising the steps of:

comparing the transcript file to the sales script with the remote server during step (G) in order to assess a word-to-word-in-changed-order score for the client sales call with the conversation critiquing engine; and designating the word-to-word-in-changed-order score as one of the plurality of communication aspects with the remote server.

7. The method as claimed in claim 1 comprising the steps of:

comparing the transcript file to the sales script with the remote server during step (G) in order to identify at least one used synonym in the transcript file with the conversation critiquing engine, wherein the used synonym contextually matches a corresponding word in the sales script; and designating the used synonym as one of the plurality of communication aspects with the remote server.

8. The method as claimed in claim 1 comprising the steps of:

parsing through the transcript file with the remote server during step (G) in order to identify at least one exact mention of the sales closing phrase in the transcript file with the conversation critiquing engine; and incrementing the sales closing count with the remote server, if the exact mention of the sales closing phrase is identified in the transcript file.

9. The method as claimed in claim 1 comprising the steps of:

parsing through the transcript file with the remote server during step (G) in order to sentimentally analyze the transcript file for at least one positive piece of client feedback with the conversation critiquing engine; and designating the positive piece of client feedback as one of the plurality of communication aspects with the remote server.

10. The method as claimed in claim 1 comprising the steps of:

parsing through the transcript file with the remote server during step (G) in order to sentimentally analyze the transcript file for at least one negative piece of client feedback with the conversation critiquing engine; and designating the negative piece of client feedback as one of the plurality of communication aspects with the remote server.

11. The method as claimed in claim 1 comprising the steps of:

providing a conversational resolving score as one of the plurality of communication aspects;

parsing through the transcript file with the remote server during step (G) in order to identify at least one client objection in the transcript file with the conversation critiquing engine;

parsing through the transcript file with the remote server during step (G) in order to identify at least one agent resolution in the transcript file with conversation critiquing engine, wherein the agent resolution is contextually related to the client objection;

incrementing the conversation resolving score with the remote server, if the client objection is identified in the transcript file, and if the agent resolution is identified in the transcript file; and decrementing the conversation resolving score with the remote server, if the client objection is identified in the transcript file, and if the agent resolution is not identified in the transcript file.

12. The method as claimed in claim 1 comprising the steps of:
   parsing through the transcript file with the remote server during step (G) in order to identify at least one speech language improvement in the transcript file with the conversation critiquing engine; and
   designating the speech language improvement as one of the plurality of communication aspects with the remote server.

13. The method as claimed in claim 1 comprising the step of:
   outputting the common conversation trend with the corresponding agent PC device of the specific agent account.

14. The method as claimed in claim 1 comprising the steps of:
   modifying the sales script in accordance to the common conversation trend with the remote server in order to update to a new sales script; and
   outputting the new sales script to the corresponding agent PC device of the specific agent account.

15. The method as claimed in claim 1 comprising the step of:
   outputting the summarization report with the corresponding agent PC device of the specific agent account after step (H).

16. The method as claimed in claim 1 comprising the steps of:
   prompting the administrator account to enter at least one script edit with the corresponding administrator PC device after step (I);
   relaying the script edit from the corresponding administrator PC device to the remote server, if the script edit is entered by the administrator account;
   applying the script edit to the sales script with the remote server in order to update to a new sales script; and
   outputting the new sales script to the corresponding agent PC device of the specific agent account.

\* \* \* \* \*